(12) United States Patent
Haskin

(10) Patent No.: US 10,190,436 B2
(45) Date of Patent: Jan. 29, 2019

(54) POWER TRANSMISSION SYSTEM FOR TURBINE, A TURBOCHARGER, A COMPRESSOR, OR A PUMP

(71) Applicant: Jay Haskin, Bryan, TX (US)

(72) Inventor: Jay Haskin, Bryan, TX (US)

( * ) Notice: Subject to any disclaimer, the term of this patent is extended or adjusted under 35 U.S.C. 154(b) by 0 days.

(21) Appl. No.: 16/002,620

(22) Filed: Jun. 7, 2018

(65) Prior Publication Data

US 2018/0320543 A1 Nov. 8, 2018

Related U.S. Application Data

(63) Continuation-in-part of application No. 15/678,769, filed on Aug. 16, 2017, which is a continuation-in-part of application No. 15/341,628, filed on Nov. 2, 2016, now Pat. No. 9,745,860.

(51) Int. Cl.
| | |
|---|---|
| *F01D 25/02* | (2006.01) |
| *F01D 15/12* | (2006.01) |
| *F01D 5/22* | (2006.01) |
| *F01D 25/16* | (2006.01) |
| *F01D 25/24* | (2006.01) |
| *F04D 25/02* | (2006.01) |

(52) U.S. Cl.
CPC ............ *F01D 15/12* (2013.01); *F01D 5/225* (2013.01); *F01D 25/162* (2013.01); *F01D 25/24* (2013.01); *F04D 25/02* (2013.01); *F05D 2220/32* (2013.01); *F05D 2220/40* (2013.01); *F05D 2240/14* (2013.01); *F05D 2240/50* (2013.01); *F05D 2240/61* (2013.01); *F05D 2260/4031* (2013.01)

(58) Field of Classification Search
CPC ........ F01D 15/12; F01D 5/225; F01D 25/162; F01D 25/24
See application file for complete search history.

(56) References Cited

U.S. PATENT DOCUMENTS

| | | | | |
|---|---|---|---|---|
| 6,278,197 | B1 * | 8/2001 | Appa | F03D 1/025 290/55 |
| 7,195,446 | B2 * | 3/2007 | Seda | F01D 1/24 415/229 |
| 7,451,592 | B2 * | 11/2008 | Taylor | F01D 1/26 60/268 |
| 9,410,430 | B2 * | 8/2016 | Haskin | F01D 1/24 |

\* cited by examiner

*Primary Examiner* — David M Fenstermacher
(74) *Attorney, Agent, or Firm* — Egbert Law Offices, PLLC

(57) ABSTRACT

A power transmission system for use with a turbine, a turbocharger, or a compressor has a housing, a first shaft mounted within the housing, a second shaft rotatably mounted within the housing and positioned exterior of the first shaft, a second set of blades affixed to the first shaft, and a second set of blades affixed to the second shaft. The first set of blades is positioned adjacent to the second set of blades. The first set of blades are rotatable in a direction opposite to the second shaft and the second set of blades. A shroud is affixed to an outer periphery of one of the sets of blades so as to have a portion overlying at least a portion of an outer periphery of the other of the first and second sets of blades. A power receiver is driven by the second shaft so as to convert rotational energy of the second shaft into energy or motion.

18 Claims, 4 Drawing Sheets

POWER TRANSMISSION SYSTEM FOR TURBINE, A TURBOCHARGER, A COMPRESSOR, OR A PUMP

CROSS-REFERENCE TO RELATED APPLICATIONS

The present application is a continuation-in-part of U.S. patent application Ser. No. 15/678,769, filed on Aug. 16, 2017, and entitled "Power Transmission System for Turbines or Compressors Having Counter-Rotating Blades", presently pending. U.S. patent application Ser. No. 15/678,769 is a continuation-in-part of U.S. patent application Ser. No. 15/341,628, filed on Nov. 2, 2016 and entitled "Power Transmission System for Turbine or Compressor Having Counter-Rotating Blades". Application Ser. No. 15/341,628 issued as U.S. Pat. No. 9,745,860 on Aug. 29, 2017.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to power transmission systems. More particularly, the present invention relates to power transmission systems as used with turbines, turbochargers, compressors, or pumps. More particularly, the present invention relates to power transmission systems having counter-rotating blades.

2. Description of Related Art Including Information Disclosed Under 37 CFR 1.97 and 37 CFR 1.98

A steam turbine is a device that extracts thermal energy from pressurized steam and uses it to do mechanical work on a rotating output shaft. Because the turbine generates rotary motion, it is particularly suited to be used to drive an electrical generator. Approximately 90% of all electrical generation in the United States is by the use of steam turbines. The steam turbine is a form of heat engine that derives much of its improvement in thermodynamic efficiency from the use of multiple stages in the expansion of the steam. Steam turbines are made in a variety of sizes ranging from small (i.e. less than 0.75 kW) to approximately 1,500,000 kW. The small units are used as mechanical drives for pumps, compressors and other shaft-driven equipment. Large turbines are used to generate electricity.

Turbine blades are of two basic types, blades and nozzles. Blades move entirely due to the impact of steam on them. Their profiles do not converge. This results in a steam velocity drop and essentially no pressure drop as steam moves through the blades. A turbine composed of blades alternating with fixed nozzles is called an impulse turbine, a Curtis turbine, a Rateau turbine, or a Brown-Curtis turbine. Nozzles appear similar to blades, but their profiles converge near the exit. This results in a steam pressure drop and velocity increase as steam moves through the nozzles. Nozzles move due to both the impact of steam on them and the reaction due to the high-velocity steam at the exit. A turbine composed of moving nozzles alternating with fixed nozzles is called a reaction turbine or a Parsons turbine.

Except for low-power applications, turbine blades are arranged in multiple stages in series, called compounding, which greatly improves efficiency at low speeds. A reaction stage is a row of fixed nozzles followed by a row of moving nozzles. Multiple reaction stages divide the pressure drop between the steam inlet and exhaust. Numerous small drops result in a pressure-compounded turbine. Impulse stages may be either pressure-compounded, velocity-compounded, or pressure-velocity compounded. A pressure-compounded impulse stage is a row of fixed nozzles followed by row of moving blades, with multiple stages for compounding. A velocity-compounded impulse stage is a row of fixed nozzles followed by two or more rows of moving blades alternating with rows of fixed blades. This divides the velocity drop across the stage into several smaller drops.

Condensing turbines are most commonly found in electrical power plants. These turbines exhaust steam from a boiler in a partially condensed state at a pressure well below atmospheric to a condenser. Non-condensing or back pressure turbines were most widely used for process steam applications. The exhaust pressure is controlled by a regulating valve to suit the needs of the process steam pressure. These are commonly found at refineries, district heating units, pulp and paper plants, and desalination facilities where large amounts of low-pressure process steam are needed. Reheat turbines are also almost used exclusively in electrical power plants. In a reheat turbine, steam flow exits from a high-pressure section of the turbine and is returned to the boiler where additional superheat is added. The steam goes back into an intermediate pressure section of the turbine and continues its expansion. Using reheat in a cycle increases the work output from the turbine and also the expansion reaches conclusion before the steam condenses. As such, this minimizes the erosion of the blades in the last rows. Extracting-type turbines are common in various applications. In an extracting-type turbine, steam is released from the various stages of the turbine and used for industrial process needs or sent to boiler feedwater heaters to improve overall cycle effect efficiency. Induction turbines introduce low-pressure steam at an intermediate stage to produce additional power.

In such turbines, a fluid stream, under pressure, impinges on a set of blades (or buckets) connected to a central shaft to produce work. This results in changes in the angular velocity of the fluid stream. These changes in an angular velocity serve to strike the next set of blades connected to the shaft in the most efficient manner. There is an intermediate set of blades which are set at a different angle to realign the flow so as to impinge upon the next set of working blades at the most efficient angle. The set of intermediate blades in most equipment is currently fixed to the stationary element. This process uses approximately 40% of the working fluid energy without producing any work.

A gas compressor is a mechanical device that increases the pressure of the gas by reducing its volume. Compressors are similar to pumps. Both increase the pressure on a fluid and both can transport the fluid through a pipe. Since gases are compressible, the compressor also reduces the volume of the gas. Axial-flow compressors are dynamic rotating compressors that use arrays of fan-like airfoils to progressively compress the working fluid. The arrays of airfoils are set in rows, usually as pairs, one rotating and one stationary. The rotating airfoils, also known as blades or rotors, accelerate the fluid. The stationary airfoils, also known as stators or vanes, decelerate and redirect the flow direction of the fluid preparing it for the rotor blades at the next stage. Axial compressors are almost always multi-stage, but the cross-sectional area of the gas passage diminishes along the compressor to maintain an optimal axial Mach number.

In the past, various patents and patent publications have issued relating to such turbines. For example, U.S. Pat. No. 4,648,788, issued on Mar. 10, 1987 to P. Jochum, describes a device and a fluid pressure generator that includes an annular casing which is peripherally mounted and driven in a through-flow channel. The interface of the annular casing forms part of the wall of the through-flow channel. The annular casing is provided with a number of propeller blades which extend radially inwardly into the through-flow channel and which are rotationally mounted on their individual pin shafts by means of which the magnitude of the thrust may be altered in a continuous manner and the direction of the operation of the thrust can be reset.

U.S. Pat. No. 4,969,325, issued on Nov. 13, 1992 Adamson et al., shows a turbofan engine having a counter-rotating partially-geared fan drive turbine. This turbofan engine has a fan section, a booster compressor disposed aft of the fan section relative to the flow of combustion gases through the engine, and a core section disposed aft the booster compressor. A low-pressure counterrotating turbine, disposed aft the core section, is used for driving the fans section and the booster compressor. The counterrotating turbine includes at least one set of rotating turbine blades and at least one set of oppositely rotating counterrotating turbine blades. A twin spool shaft is provided for coupling the turbine blades to the booster compressor and for coupling the counterrotating turbine blades to the fans section.

U.S. Pat. No. 6,278,197, issued on Aug. 21, 2001 the K. Appa, discloses a contra-rotating wind turbine system. A hub assembly is provided having inner and outer coaxial shafts telescopically related but radially spaced to permit independent rotation about a generally horizontal axis. A first set of rotor blades is mounted on the inner shaft at a plurality of circumferentially-spaced locations. The rotor blades extend radially away from the axis of rotation and positioned on the inner shaft for rotating the inner shaft in a first direction about the axis of rotation when subjected to wind-induced airflow. A second set of rotor blades is similarly mounted on the outer shaft axially spaced from the first set of rotor blades for rotating the outer shaft about the axis of rotation in an opposite direction.

U.S. Pat. No. 7,195,446, issued a Mar. 27, 2007 to Seda et al., provides a counter-rotating turbine engine that provides a low-pressure turbine inner rotor configured to rotate in a first direction and a low-pressure turbine outer rotor configured to rotate in a second direction that is opposite to the first rotational direction. At least one foil bearing is coupled to at least one of the inner and outer rotors so as to improve clearance control between a first rotating component and at least one of a second rotating component and a non-rotating component.

U.S. Pat. No. 7,290,386, issued on Nov. 6, 2007 to Orlando et al., teaches a counter-rotating gas turbine engine. A low-pressure turbine inner rotor includes a first plurality of turbine blade rows configured to rotate in a first direction and a low-pressure turbine outer rotor rotatably coupled to the inner rotor. The outer rotor includes a second plurality of turbine blade rows that are configured to rotate in a second direction that is opposite the first rotational direction of the inner rotor such that at least one of the second plurality of turbine blade rows is coupled axially forward of the first plurality of turbine blade rows.

U.S. Pat. No. 7,451,592, issued on Nov. 18, 2008 to Taylor et al., teaches a counter-rotating turbine engine which includes a gearbox. The turbine engine arrangement is provided with contra-rotating shafts and a gearbox which is also coupled to a shaft. The relative rotational speed ratio between the shafts can be determined with a first low-pressure turbine secured to the first shaft arranged to rotate at a lower speed but provide high work whilst a second low-pressure turbine secured to the second shaft rotates at a higher speed governed by the gearbox.

U.S. Pat. No. 8,393,853, issued on Mar. 12, 2013 to Sauer et al., provides a high-efficiency turbine and method of generating power. The turbine includes a plurality of blades that rotate in a single direction when exposed to a fluid flow. The plurality of blades are joined to the central shaft by a plurality of radial spokes disposed substantially perpendicular to the central shaft such that the rotating plurality of blades causes the shaft to rotate.

U.S. Patent Publication No. 2012/0049523, published on Mar. 1, 2012 to S. A. Bersiek, describes a wind jet turbine with fan blades located on an inner and outer surface of the cylinder so as to allow wind or liquid to pass through the inner and outer blades. The wind jet turbine has a first set of fan blades, a plurality of magnets that each has a magnetic field, a cylinder having an inside and outside surface that supports the first set of fan blades on the inside surface and coupled to the plurality of magnets, and at least one cable winding located apart from the magnets. The rotation of the cylinder results in the movement of the magnetic field across at least one cable winding.

U.S. Patent Publication No. 2013/0219859, published in Aug. 29, 2013 to Suciu et al., provides a counter-rotating low-pressure compressor and turbine. The compressor section includes a counter-rotating low-pressure compressor that includes outer and inner compressor blades interspersed with one another and configured to rotate in opposite directions to one another about an axis of rotation. A transmission couples at least one of the outer and inner compressor blades to a shaft. The turbine section includes a counter-rotating low-pressure turbine having an outer rotor that includes an outer set of turbine blades. An inner rotor has an inner set of turbine blades interspersed with the outer set of turbine blades. The outer rotor is configured to rotate in an opposite direction about the axis of rotation from the inner rotor. A gear system couples at least one of the outer and inner rotors to the shaft.

U.S. Patent Publication No. 2013/0230380, published on Sep. 5, 2013 to Allouche et al., discloses a rotating housing turbine. The housing has a side wall. The turbine blades are attached to the side wall. The turbine is completely open in the center so as to allow a space for solids and debris to be directed out of the turbine without jamming the spinning blades/side wall.

U.S. Pat. No. 3,524,318, issued on Aug. 18, 1970 shows a gas turbine power plant having an axial-flow compressor. This axial flow compressor includes counter-rotating rotors.

U.S. Pat. No. 3,673,802, issued on Jul. 4, 1972 to Krebs et al., describes a fan engine with a counter-rotating geared core booster. The compressor has a pair of counter-rotating elements, a rotating duct which carries fan blades on the exterior surface, and compressor blades on the interior surface. A conventional compressor rotor rotates in a direction counter to the direction of the rotation of the rotating duct. Alternative gearing schemes are shown for coupling the rotation of the fan to the rotation of the low-pressure compressor.

U.S. Pat. No. 4,159,624, nation of Jul. 3, 1979 to G. P. Gruner, describes a gas turbine power plant that has a compressor stage and a turbine stage with an annular combustion stage therebetween. Each of the counter-rotating compressor rotors is connected to one of the counter-rotatable turbine rotors by an elongated hollow cylindrical shaft concentric with an axially extending fixed shaft to form an integral unit. The units are operably connected by differential gearing mounted on the fixed shaft.

U.S. Pat. No. 4,790,133, issued on Dec. 13, 1988 to A. R. Stuart, shows a counter-rotating turbo fan engine. This engine has a core gas generator for generating combustion gases, a power turbine, a fan section, and a booster. The power turbine includes first and second counter rotating turbine blade rows effective for rotating first and second driveshafts, respectively. The fan section includes a first fan blade row connected to the first driveshaft and a second fan blade row connected to the second driveshaft.

U.S. Pat. No. 4,860,537, issued on Aug. 29, 1989 to J. B. Taylor, describes a counter rotating gearless front fan engine for generating combustion gases. The power turbine includes a pair of counter-rotating turbine blade rows which are alternately interdigitized and serve to rotate counter-rotating first and second driveshafts, respectively. The fan section includes counter-rotating spaced apart fan blade sections which are respectively connected to the first and second driveshafts.

U.S. Patent Application Publication No. 2006/0090451, published on May 4, 2006 to Moniz et al., provides a counter-rotating gas turbine engine in which a first fan assembly includes a plurality of rotor blades that are configured to rotate in a first rotational direction at a first rotational speed and a second fan assembly including a plurality of rotor blades that are configured to rotate in a second rotational direction. A gearbox is coupled to the second fan assembly which is configured to rotate the second fan assembly at a second rotational speed that is different than the first rotational speed.

U.S. Patent Application Publication No. 2011/0000222, published on Jan. 6, 2011 to Black et al., provides a rotor stator support system for a gas turbine. The system includes at least one support leg in operable communication with a bearing of the rotor and with the support base. There is at least one strut in communication with the support leg and with the stator.

U.S. Patent Application Publication No. 2013/0223993, published on Aug. 29, 2013 to Merry et al., teaches a gas turbine engine that includes a shaft that defines an axis of rotation. An outer rotor directly drives the shaft and includes an outer set of blades. An inner rotor has an inner set of blades interspersed with the outer set of blades. The inner rotor is configured to rotate in an opposite direction about the axis of rotation from the outer rotor. A gear system couples the inner rotor to the shaft and is configured to rotate the inner set of blades at a faster speed than the outer set of blades.

U.S. Pat. No. 9,410,430, issued on Aug. 9, 2016 to the present inventor, teaches a turbine apparatus with counter-rotating blades. In particular, FIG. 1 herein shows this turbine apparatus. Referring to FIG. 1 herein, there shown the turbine apparatus 10 in accordance with the present invention. The turbine apparatus 10 includes a first set of blades 12, a second set of blades 14, a main shaft 16, a barrel 18, and an outer shell 20. In FIG. 1, it can be seen that the first set of blades 12 is directly mounted to the main shaft 16. The second set of blades 14 is directly mounted, at a periphery thereof, to the barrel 18 or the housing. The main shaft 16 extends centrally through the first set of blades 12 and the second set of blades 14. The main shaft 16 is not connected to the second set of blades 14. In the preferred embodiment the present invention, the second set of blades 14 will rotate in a direction opposite to the second set of blades 12 and to the direction of rotation of the main shaft 16. As a result, the barrel 18 will rotate in a direction opposite to the rotation of the main shaft 16.

In FIG. 1, it can be seen that there is a third set of blades 22 that is affixed to the main shaft 16. The third set of blades 22 extends in generally parallel relationship to the first set of blades 12. The second set of blades 14 is positioned between the first set of blades 12 and the second set of blades 14. There is a fourth set of blades 24 that is mounted, at the periphery thereof, to the barrel 18. As such, when the first of blades 12 and the third set of blades 22 rotate with the rotation of the main shaft 16, the second set of blades 14 and the fourth set of blades 24 will rotate in the opposite direction.

A fluid inlet 26 is directed toward the first set of blades 12 within the interior of the barrel 18. The fluid inlet 26 includes a nozzle 28 for directing the fluid into the interior of the barrel 18 and toward the first set of blades 12. The injection of the fluid through the fluid inlet 26 will impart rotational movement to the first set of blades 12. The direction of the blades within the first set of blades 12 will impart an opposite directional movement to the second set of blades 14 such that the barrel 18 will rotate in the opposite direction. The orientation of the blades of the second set of blades 14 will be directed to the third set of blades 22 so as to further direct rotational energy toward the third set of blades 22. Similarly, the orientation of the blades in the third set of blades 22 is directed to the fourth set of blades 24 so as to further enhance the torque applied by the fourth set of blades 24 to the barrel 18.

The shaft 16 is mounted within bearings and supported by a bearing pedestal 30. The bearing pedestal 30 can be supported upon an underlying surface, such as a floor or deck. The bearing supports the main shaft 16 in a rotatable configuration. The rotatable shaft 16 can extend for use exterior of the turbine apparatus 10. For example, the main shaft 16 can extend so as to be linked to a power source, such as an electrical generator, a boiler feed pump, a compressor, a water pump, a hydraulic unit, or other systems that can utilize rotational energy.

The outer shell 20 extends around the exterior of the barrel 18. As such, the interior of the outer shell 20 is sufficiently sealed so as to avoid loss of pressurized fluid and friction with exterior elements.

As will be described hereinafter, the rotating barrel 18 can be suitably coupled to allow for the rotation of another shaft or to facilitate the rotation of the main shaft 16. For example, the rotating barrel 18 can be coupled by a gear arrangement to another shaft located adjacent to the main shaft 16. Alternatively, a planetary gear arrangement can be coupled between the barrel 18 in the main shaft 16 such that rotational energy of the barrel 18 can be delivered to the main shaft. Still further and alternatively, various rollers, or other connecting devices, can be coupled to the barrel 18 such that the rotating energy of the barrel 18 can be delivered for external use.

U.S. Pat. No. 9,745,860, issued on Aug. 29, 2017 to the present inventor describes a power transmission system for a turban or compressor that has counter-rotating blades. The power transmission system has a housing, a first shaft rotatably mounted within the housing, a second shaft rotatably mounted within the housing and extending around at least a portion of the first shaft, a third shaft exterior of the first and second shafts and positioned within the housing, a first transmission connected to the second shaft and to the third shaft such that a rotation of the second shaft causes a rotation of the third shaft, a second transmission connected to the first shaft and to the third shaft such that a rotation of the first shaft applies rotational energy to the third shaft, and a power receiver connected to the third shaft so as to convert rotational energy of the third shaft into energy or motion.

It is an object of the present invention to provide a power transmission apparatus that can be used in association with a turbine, a turbocharger, a pump, or a compressor.

It is another object of the present invention to provide a power transmission system which utilizes a greater percentage of the energy of the working load.

It is another object of the present invention to provide a power transmission system which reduces energy losses in the area between the counter-rotating blades.

It is another object of the present invention to provide a power transmission system that is suitable for powering boiler feed pumps, auxiliary pumps, hydraulics, and electrical generators.

It is another object of the present invention to provide a power transmission system that is able to couple the energy from counter-rotating blades to an external power receiver, such as a generator or a pump.

It is another object of the present invention so as to provide a power transmission system that allows the system to power more than one load or device.

It is still a further object of the present invention to provide a power transmission system that can be used to power a propeller while also providing jet thrust.

These and other objects and advantages of the present invention will become apparent from a reading of the attached specification and appended claims.

BRIEF SUMMARY OF THE INVENTION

The present invention is an apparatus for use with a turbine, a turbocharger, a compressor, or a pump. The apparatus comprises a housing, a first shaft rotatably mounted within the housing, a second shaft rotatably mounted within the housing and positioned exterior of the first shaft, a first set of blades affixed to the first shaft, and a second set of blades affixed to the second shaft. The first set of blades is positioned adjacent to the second set of blades. The first shaft and the first set of blades are rotatable in a direction opposite to the second shaft and the second set of blades.

In the present invention, there is a shroud that is affixed to an outer periphery of one of the sets of blades. The shroud has a portion overlapping at least a portion of the outer periphery of the other of the first and second sets of blades. More particularly, in the preferred embodiment of the present invention, the shroud is affixed to the outer periphery of the second set of blades and has a portion overlapping at least a portion of the outer periphery of the first set of blades. In this embodiment, the outer periphery of the second set of blades has an greater diameter than the outer periphery of the first set of blades. A power receiver can be driven by the second shaft so as to convert rotational energy of the second shaft into energy or motion.

A first bearing set bears against the first shaft. A second bearing set bears against the second shaft. A bearing support is positioned interior of the housing and supports the first and second bearing sets in a desired position within the housing. A baffle is positioned in the housing on a side of the first set of blades opposite the second set of blades. The baffle serves to direct a fluid in a desired direction toward the first set of blades. Each blade of the first set of blades is directed in a direction different than a direction of each blade of the second set of blades.

In one embodiment the present invention, the housing has a fluid inlet and a fluid outlet. The fluid inlet directs a fluid toward the first set of blades. The fluid outlet directs the exhaust from the second set of blades outwardly of the housing. In this embodiment, the apparatus is a turbocharger. A compressor is cooperative with at least one of the first and second shafts and is adapted to compress another fluid.

In an alternative embodiment of the present invention, a driver is affixed to one of the first and second shafts so as to impart rotational energy to at least one of the shafts. A transmission is also connected to the first and second shafts. The transmission causes the rotational energy of one of the first and second shafts to cause rotation of the other of the first and second shafts. In particular, in this embodiment of the present invention, the driver drives the first shaft and the transmission causes the first shaft to drive the second shaft. This embodiment of the apparatus is a compressor or a pump.

In another alternative embodiment of the present invention, the apparatus is a turbine. In this embodiment, a third set of blades is affixed to the first shaft and a fourth set of blades affixed to the second shaft. The third and fourth sets of blades are positioned interior of the housing. The third and four sets of blades are positioned adjacent to an end of the housing opposite the first and second sets of blades. The second set of blades has an outer periphery with a diameter less than a diameter of the outer periphery of the first set of blades. A shroud is affixed to the outer periphery of the first set of blades so as to have a portion overlying a portion of the outer periphery of the second set of blades. A combustor is positioned in an interior of the housing in a location between the first and second sets of blades and the third and four sets of blades. The housing has a first end and a second end and a second central portion. The first and second ends have a diameter greater than a diameter of the central portion.

This foregoing Section is intended to describe, with particularity, the preferred embodiments of the present invention. It is understood that modifications to this preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
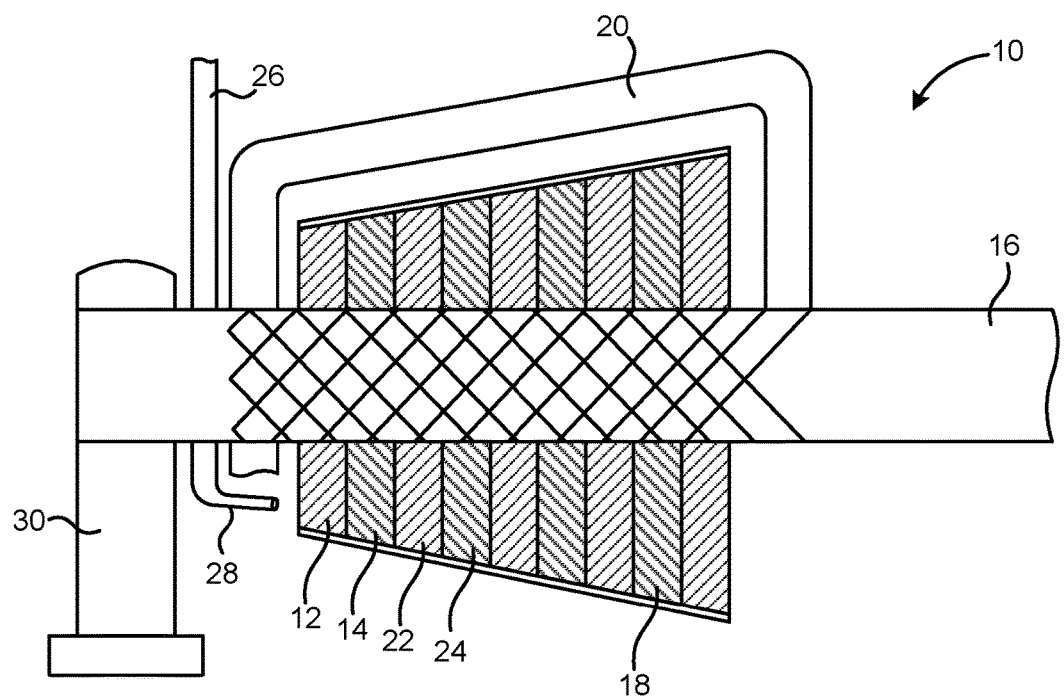
FIG. 1 is a cross-sectional view showing a compressor or turbine with counter-rotating blades in accordance with U.S. Pat. No. 9,410,430 to the present inventor.
Figure 2:
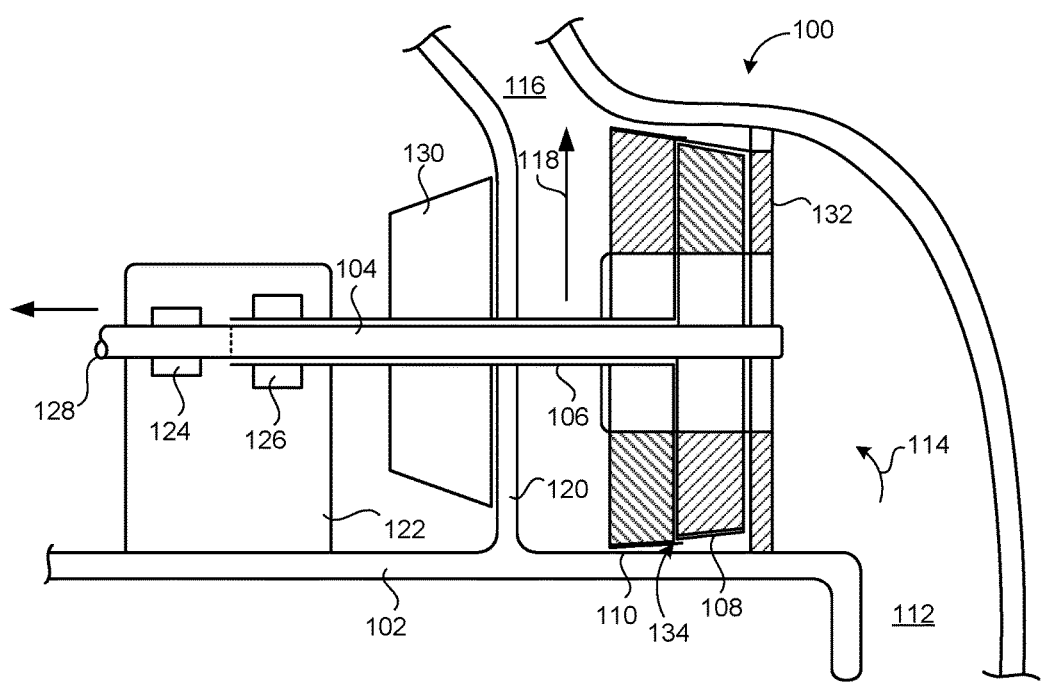
FIG. 2 is a cross-sectional view of power transmission of this a system of the present invention for use as a turbocharger.

Referring to FIG. 2, there shown the power transmission system 100 as used in association with a turbocharger. The power transmission system 100 has a housing 102, a first shaft 104 rotatably mounted within the housing 102, and a second shaft 106 rotatably mounted within the housing 102. The first shaft 104 is positioned interior of the second shaft 106. A first set of blades 108 is affixed to the first shaft 104. A second set of blades 110 is affixed to the second shaft 106. The first set of blades 108 is positioned adjacent to the second set of blades 110. The first shaft 104 and the first set of blades 108 are rotatable in a direction opposite to the second shaft 106 and the second set of blades 110.

In FIG. 2, it can be seen that the housing 102 includes a fluid inlet 112 which allows fluid to flow in the direction of arrow 114. The housing 102 also includes a fluid outlet 116 which allows exhaust to flow outwardly of the housing 102 in the direction of arrow 118. The shafts 104 and 106 extend through a wall 120 in the housing. Wall 120 serves to direct the exhaust from the first set of blades 108 and the second set of blades 110 outwardly through the fluid outlet 116. A bearing support 122 is affixed to the housing 102 and extends upwardly therefrom. Bearing support 122 supports bearing sets 124 and 126. Bearing set 124 bears against the first shaft 104. The bearing set 126 bears against the second shaft 106. Bearing sets 124 and 126 support the respective shafts 104 and 106 within the interior of the housing 102.

The first shaft 104 is affixed to the first set of blades 108 and extends through the wall 120, through the bearing set 124, and outwardly thereof. As such, the end 128 of the first shaft 104 can be used to impart rotational motion to an external device for the production of energy or motion. The rotational motion of the first set of blades 108 drives the first shaft 104 and drives the external device, such as a power receiver, that is affixed to the end 128 of the first shaft 104.

The second shaft 106 is affixed to the second set of blades 110 and is cooperative with the compressor 130. As such, the rotation of the second set of blades 110 can act so as to drive the second shaft 106 in order to operate the compressor 130 in the compressor stage of the turbocharger. In this configuration, the arrangement of the shafts 104 and 106 actually allows the power transmission system 100 to provide energy to two different loads.

A baffle 132 is mounted within the interior of the housing 102 adjacent to the side of the first set of blades 108 opposite to the second set of blades 110. Baffle 132 is configured so as to direct the fluid flow 114 in a desired direction toward the blades of the first and second sets of blades. As such, this acts as a nozzle for the directing of flow. The force of the fluid flow 114 causes the rotation of the first set of blades 108 in the second set of blades 110. As such, this fluid flow 114 between the fluid inlet 112 in the fluid outlet 116 impart strong rotational motion to the respective shafts 104 and 106.

The first set of blades 108 has an outer periphery that is somewhat truncated. As such, the side of the first set of blades 108 adjacent to the baffle 132 will have an outer periphery having a diameter less than the diameter of the first set of blades 108 adjacent to the second set of blades 110. The second set of blades 110 has an outer periphery with a diameter greater than the outer diameter of the first set of blades 108. A shroud 134 is affixed to this outer periphery of the second set of blades 110 so as to have a portion that overlaps for overlies the outer periphery of the first set of blades 108. As such, this serves to prevent energy losses between the first set of blades 108 and the second set of blades 110. This further enhances the efficiency of the counterrotating sets of blades 108 and 110. The blades of the first set of blades 108 extend in a different direction than the blades of the second set of blades 110.

In the power transmission system 100 of FIG. 2, the end of the first shaft 104 can drive, another compressor stage, can drive a generator, and can provide power to hydraulics. As such, this type of turbine could be used in association with water for large ships. The bearings 124 and 126 can be conventional bearings, can be sleeve bearings, or can be fluid bearings. The bearings 124 and 126 are located remotely from the wall 120 and the exhaust flow 118 of the fluid so as to maintain the bearings 124 and 126 in a relatively cool environment.

Figure 3:
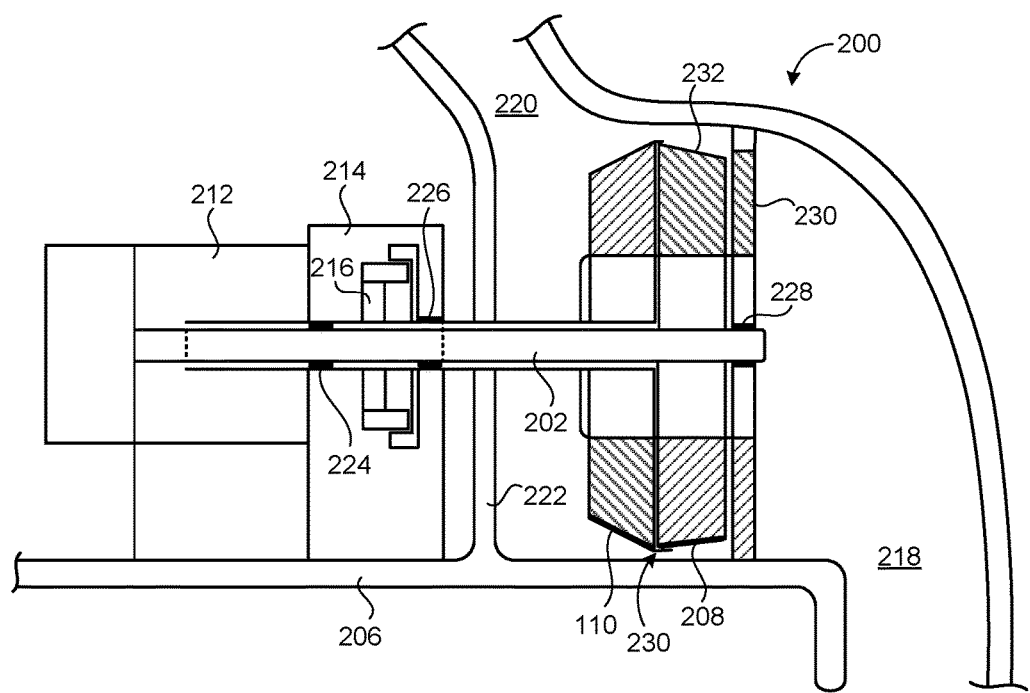
FIG. 3 is a cross-sectional view of the power transmission system of the present invention for use with a compressor or pump.

FIG. 3 shows the power transmission system 200 in accordance with an alternative embodiment of the present invention. The power transmission system 200 includes a first shaft 202 and a second shaft 204. The first shaft 202 in the second shaft 204 are positioned within the interior of a housing 206. The first shaft 202 is located interior of the second shaft 204. The first shaft 202 is affixed to a first set of blades 208. The second shaft 204 is affixed to a second set of blades 210. A driver 212 is drivingly connected to at least one of the first and second shafts. A transmission system 214 connects the shafts 202 and 204 to specific gearing 216. As such, the rotation of shaft 202 can impart rotational motion to the second shaft 204 in accordance with a desired transmission or gearing ratio. Alternatively, the gearing 216 can be connected to an external device so as to provide rotational motion for the powering of the external device by way of the rotation of the shafts 202 and 204.

The housing 206 has a fluid inlet 218 and a fluid outlet 220. Fluid outlet 220 is in the area between the wall 222 and the second set of blades 210. As such, the transmission system 214 will be isolated from the exhaust that flows through the fluid outlet 220. The shaft 202 is supported by the transmission 214 through the use of bearings 224. The second shaft 204 is supported by the transmission 214 by bearings 226. The first shaft 202 can also be supported by bearings 228 located in the baffle 230.

In FIG. 3, it can be seen that the outer periphery of the second set of blades 210 has a shroud 230 affixed thereto. Shroud 230 will extend so as to overlap with a portion of the outer periphery 232 of the first set of blades 208. Once again, this serves to reduce energy losses between the first set of blades 208 and the second set of blades 210. The second set of blades 210 has an outer periphery that is truncated so that a narrow diameter is adjacent to the fluid outlet 220 and a wide diameter is adjacent to the first set of blades 208. The first set of blades 208 is truncated so as to have a narrow diameter adjacent to the baffle 230 and a wide diameter adjacent to the second set of blades 210.

In FIG. 3, it can be seen that the power transmission system 200 can be used with a compressor or a pump. This power transmission system can either be driven by the driver 212 or can be actually used to such that the driver 210 drives some other external device. As such, the fluid flow through the fluid inlet 218, through the first and second sets of blades 208 and 210, and through the fluid outlet 220 can rotate the first set of blades 208 and the second set of blades 210 so as to respectively rotate the first shaft 220 so as to provide rotational energy to the driver 212. The rotation of the second set of blades 210 causes the second shaft 204 to rotate so as to cause the transmission to apply rotational energy to another external device or to the first shaft 202.

Figure 4:
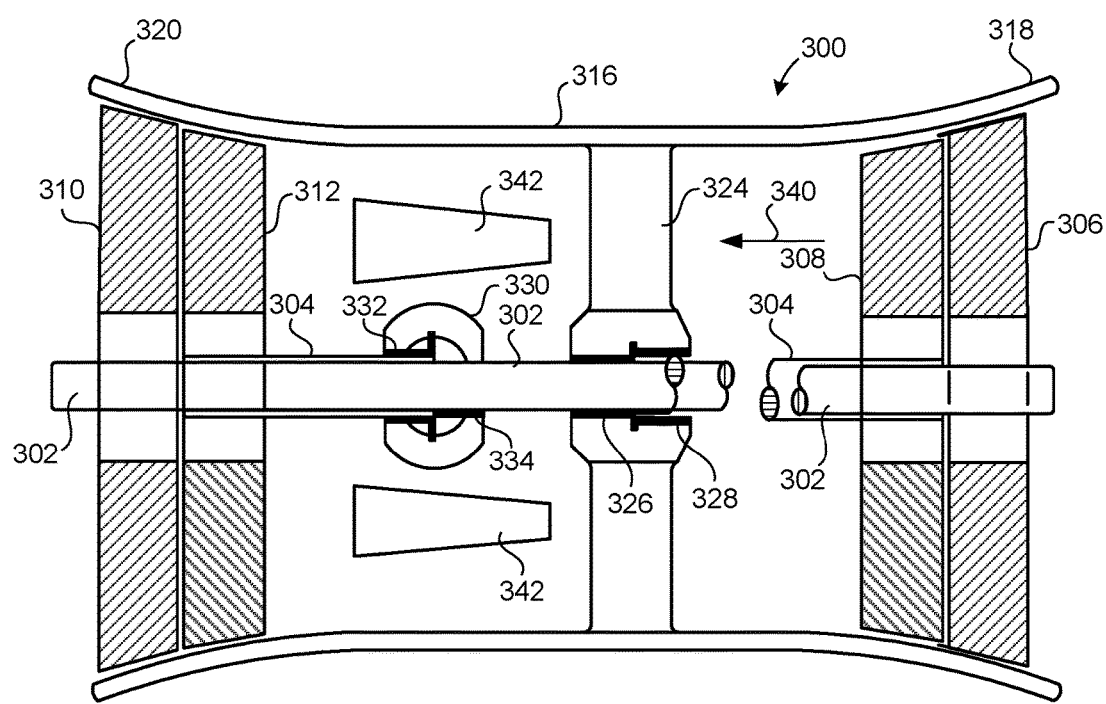
FIG. 4 is a cross-sectional view of the power transmission system of the present invention as used with a turbine.

FIG. 4 shows the power transmission system 300 in accordance with another alternative embodiment of the present invention. The power transmission system 300 is used with a turbine.

In FIG. 4, it can be seen that there is a first shaft 302 and a second shaft 304. The first shaft 302 is located in interior of the second shaft 304. The first shaft 302 is affixed to a first set of blades 306. The second shaft 304 is affixed to a second set of blades 308. Furthermore, in FIG. 4, the first shaft 302 is affixed to a third set of blades 310. The second shaft 304 is affixed to a fourth set of blades 312. The first set of blades 306 is positioned adjacent to the second set of blades 308. Similarly, the third set of blades 310 is positioned adjacent to the fourth set of blades 312. The shafts 302 and 304, and the sets of blades 306, 308, 310, and 312 are located within the interior of a housing 314.

The housing 314 has a conventional shape of a turbine. In particular, the housing 314 has a central portion 316, a first end 318 and a second end 320. Each of the first end 318 and the second end 320 have a diameter greater than the diameter of the central portion 316. The first set of blades 306 and the second set of blades 308 is located at the first end 318 of the housing 314. The third set of blades 310 and the fourth set of blades 312 are located adjacent to the second end 320 of the housing 314. It can be seen that the first shaft 302 can extend outwardly of each of the ends 318 and 320 of the housing 314 and can be used, if desired, to drive external appliances, such as generators, hydraulics, pumping, or other equipment. A bearing support 324 is positioned in the interior of the housing 314 and utilizes suitable bearings 326 to support the first shaft 302. Bearings 328 are positioned within the support 324 so as to support the second shaft 304 therein. A bearing housing 330 is also positioned within the interior of the housing 304 and similarly uses bearings 332 to support the second shaft 304 and bearings 334 to support the first shaft 302.

In the nature of a conventional turbine, the fluid will flow through the first set of blades 306 and the second set of blades 308 in the direction of arrow 340 through the interior of the housing 314. A combustor 342 is located within the interior of housing 314 so as to combust the fluids flowing therethrough. The fourth set of blades 312 and the third set of blades 310 allow the combusted fluid to be released in the form of an exhaust from the second end 320 of the housing 314.

In the turbocharger form of the present invention, as shown in FIG. 2, the counter-rotating elements allow the power transmission system 202 power more than one load or device. For example, it can power to stages of compressor loads. The compressor or pump form of the present invention, as shown in FIG. 3, uses a driver to power the rotating elements. The gearing is used provide counter-rotation. The serves to result in more efficient operation of the driver. In the turbine form of the present invention, as shown in FIG. 4, the power transmission system can be used to power a propeller or other device while providing jet thrust. This can be useful in drone aircraft, unmanned aerial vehicles and other similar devices.

In each of the forms of the present invention, there is a shroud or a projected portion of the blade assembly which surrounds the preceding the element so as to reduce energy losses. In the turbine form of the present invention, shown in FIG. 4, there are two sets of blades 306 and 308, along with sets of blades 310 and 312. Within the turbine form of the present invention, only a single set of such blades may be necessary.

The foregoing disclosure and description of the invention is illustrative and explanatory thereof. Various changes in the details of the illustrated construction can be made within the scope of the present claims without departing from the true spirit of the invention. The present invention should only be limited by the following claims and their legal equivalents.

I claim:

1. An apparatus comprising:
   a housing;
   a first shaft rotatably mounted within said housing;
   a second shaft rotatably mounted within said housing, said first shaft positioned interior of said second shaft;
   a first set of blades affixed to said first shaft;
   a second set of blades affixed to said second shaft, said first set of blades positioned adjacent to said second set of blades, said first shaft and said first set of blades being rotatable in a direction opposite to said second shaft and said second set of blades;
   a first bearing set bearing against said first shaft;
   a second bearing set bearing against said second shaft; and
   a bearing support positioned in said housing, said bearing support supporting said first and second bearing sets.

2. The apparatus of claim 1, an outer periphery of said second set of blades having a shroud affixed thereto, said shroud having a portion overlapping at least a portion of an outer periphery of said first set of blades.

3. The apparatus of claim 2, the outer periphery of said first set of blades having a diameter less than a diameter of the outer periphery of said second set of blades.

4. The apparatus of claim 1, further comprising:
   a power receiver being driven by said second shaft so as to convert rotational energy of said second shaft into energy or motion.

5. The apparatus of claim 1, further comprising:
   a baffle positioned in said housing on the side of said first set of blades opposite said second set of blades, and baffle adapted to direct a fluid in a desired direction toward said first set of blades.

6. The apparatus of claim 1, each blade of said first set of blades being directed in a direction different than a direction of each blade of said second set of blades.

7. The apparatus of claim 1, said housing having a fluid inlet and a fluid outlet, said fluid inlet directing a fluid toward said first set of blades, said fluid outlet directing an exhaust from said second set of blades outwardly of said housing.

8. The apparatus of claim 7, the apparatus being a turbocharger.

9. The apparatus of claim 8, further comprising:
   a compressor cooperative at least one of said first and second shafts, said compressor adapted to compress another fluid.

10. An apparatus comprising:
    a housing;
    a first shaft rotatably mounted within said housing;
    a second shaft rotatably mounted within said housing, said first shaft positioned interior of said second shaft;
    a first set of blades affixed to said first shaft;
    a second set of blades affixed to said second shaft, said first set of blades positioned adjacent to said second set of blades, said first shaft and said first set of blades being rotatable in a direction opposite to said second shaft and said second set of blades;

a driver affixed to one of said first and second shafts, said driver imparting rotational energy to said to at least one of said first and second shafts; and a transmission connected to said first and second shafts, said transmission causing the rotational energy of one of said first and second shafts to cause a rotation of the other of said first and second shafts.

11. The apparatus of claim 10, said driver driving said first shaft, said transmission causing said first shaft to rotate said second shaft.

12. The apparatus of claim 10, the apparatus being a compressor or a pump.

13. An apparatus comprising:

a housing;

a first shaft rotatably mounted within said housing;

a second shaft rotatably mounted within said housing, said first shaft positioned interior of said second shaft;

a first set of blades affixed to said first shaft;

a second set of blades affixed to said second shaft, said first set of blades positioned adjacent to said second set of blades, said first shaft and said first set of blades being rotatable in a direction opposite to said second shaft and said second set of blades;

a third set of blades affixed to said first shaft; and a fourth set of blades affixed to said second shaft, said third and fourth sets of blades positioned interior of said housing.

14. The apparatus of claim 13, said third and fourth sets of blades being positioned adjacent to an end of said housing opposite said first and second sets of blades.

15. The apparatus of claim 13, said first set of blades having an outer periphery, said second set of blades having an outer periphery with a diameter less than a diameter of the outer periphery of said first set of blades.

16. The apparatus of claim 15, further comprising:

a shroud affixed to said outer periphery of said first set of blades, said shroud having a portion overlying a portion of the outer periphery of said second set of blades.

17. The apparatus of claim 13, the apparatus being a turban, the apparatus further comprising:

a combustor positioned in an interior of said housing in a location between said first and second sets of blades and said third and fourth sets of blades.

18. The apparatus of claim 17, said housing having a first end and a second end and a central portion, said first and second ends having a diameter greater than a diameter of said central portion.

* * * * *